US006708333B1

(12) United States Patent
Glerum et al.

(10) Patent No.: US 6,708,333 B1
(45) Date of Patent: Mar. 16, 2004

(54) METHOD AND SYSTEM FOR REPORTING FAILURES OF A PROGRAM MODULE IN A CORPORATE ENVIRONMENT

(75) Inventors: Kirk A. Glerum, Redmond, WA (US); Matthew J. Ruhlen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 09/602,284

(22) Filed: Jun. 23, 2000

(51) Int. Cl.$^7$ .......................... G06F 9/44; G06F 12/00; G06F 11/00
(52) U.S. Cl. .............. 717/171; 717/168; 717/174; 717/176; 707/200; 714/100
(58) Field of Search ............... 717/168–178; 707/200; 714/100

(56) References Cited

U.S. PATENT DOCUMENTS

| | | | | |
|---|---|---|---|---|
| 4,823,345 A | * | 4/1989 | Daniel et al. | 714/781 |
| 4,965,772 A | * | 10/1990 | Daniel et al. | 709/224 |
| 5,119,377 A | * | 6/1992 | Cobb et al. | 714/38 |
| 5,119,493 A | * | 6/1992 | Janis et al. | 709/101 |
| 5,142,663 A | * | 8/1992 | Janis et al. | 707/205 |
| 5,539,877 A | * | 7/1996 | Winokur et al. | 714/26 |
| 5,576,955 A | * | 11/1996 | Newbold et al. | 715/533 |
| 5,631,847 A | * | 5/1997 | Kikinis | 709/207 |
| 5,701,487 A | * | 12/1997 | Arbouzov | 717/124 |
| 5,778,184 A | * | 7/1998 | Brownmiller et al. | 709/224 |
| 6,230,284 B1 | * | 5/2001 | Lillevold | 714/13 |
| 6,397,244 B1 | * | 5/2002 | Morimoto et al. | 709/200 |
| 6,408,434 B1 | * | 6/2002 | Fujiwara | 717/170 |

OTHER PUBLICATIONS

"Debugging Applications" by John Robbins, Microsoft Press, 2000.*
"MCSE: Windows 2000 Professional Study Guide, Second Edition", by Lisa Donald and James Chellis, Sybex, 2001.*

* cited by examiner

Primary Examiner—Wei Zhen
Assistant Examiner—Kenneth A Gross
(74) Attorney, Agent, or Firm—Merchant & Gould (57) ABSTRACT

A computer-implemented method and system for reporting failures in an application program module to a corporate file server. The failure may be a crash or a set-up failure. Once detected, the program failures are categorized, i.e. bucketed, and reported directly to a local file server operated by a corporation. The corporate file server may be used to store the failures encountered by users in a corporate environment until these failures are reported to a server operated by the manufacturer of the program module (a destination server). Once the failures are reported to the destination server, developers or programmers may examine the data and determine what is causing the failures in the program module. A failure reporting executable on the user's computer provides communications between the failed application program module and the local file server. An administrative reporting executable (typically operated at the corporate file server) provides communications between the failure reporting executable and the corporate file server and between the corporate file server and the destination server. A cab tree, a counts tree and a status tree stores bucket information for a failure at the corporate file server. The bucket information for a crash may comprise an AppName, an AppVer, a ModuleName, a ModuleVer, and an offset into that module. The bucket information in the corporate file server may be uploaded to a destination server by a corporate system administrator thus preventing sensitive information from being disclosed by the corporation's users.

24 Claims, 5 Drawing Sheets

...POLICY.TEXT → 320
...STATUS\ → 315
...CABS\ → 310
...COUNTS\ → 305

*FIG. 3*

...COUNTS\ ⟵ 305
　<APP>\
　　<VERSION>\
　　　<MODULE>\
　　　　<VERSION>\
　　　　　<OFFSET>\ ⎫
　　　　　　COUNT.TXT ⎭ 405
　　　　　　↑
　　　　　　410

*FIG. 4*

...CABS\ ⟵ 310
　<APP>\
　　<VERSION>\
　　　<MODULE>\
　　　　<VERSION>\
　　　　　<OFFSET>\ ⎫
　　　　　　01234567.CAB ⎬ 405
　　　　　　76543210.CAB ⎪
　　　　　　24681357.OLD ⎭
　　　　　　HITS.LOG

*FIG. 5*

...STATUS\ ⟵ 315
　<APP>\
　　<VERSION>\
　　　<MODULE>\
　　　　<VERSION>\
　　　　　<OFFSET>\ ⎫
　　　　　　STATUS.TXT ⎭ 405

METHOD AND SYSTEM FOR REPORTING FAILURES OF A PROGRAM MODULE IN A CORPORATE ENVIRONMENT

TECHNICAL FIELD

This invention relates to software program modules. More particularly, this invention relates to a method and system for reporting failures of a program module to a corporate file server before transmitting the failures to a repository for storage and analysis.

BACKGROUND OF THE INVENTION

Despite the best efforts of software developers, software programs inevitably fail at one time or another. One type of failure is a crash. A crash occurs while a program module is running and results in the suspension of operation of the program module. Crashes are frustrating to users and, in some cases, may cause the user to lose work. Another type of software program failure is a setup failure. Set-up failures occur during installation of a program module onto a user's computer. Set-up failures may prevent certain aspects of the program module, or even the entire program module, from being installed on a user's computer.

Crashes and set-up failures create a significant amount of work for product support personnel. Product support personnel, typically contacted via telephone, are often limited in their ability to diagnose problems due to the limited amount of information they can receive from the user. For example, the product support personnel may only know what the user was doing when the crash occurred or at what point of the installation the set-up failure occurred. There may be a significant amount of information on the user's computer that may be useful to the product support personnel or to the software developers to diagnose the failures. However, because product support personnel and the software developers are not physically present at the user's computer, this information can not be extracted and analyzed.

Thus, there is a need for a method and system for extracting from a computer relevant information regarding a failure of a program module, including the location of the failure, and transmitting this information to a software manufacturer so that the failure may be diagnosed and corrected. There is also a need for a method and system for requesting information from a failed program module, in addition to the location of the failure, and transmitting this additional information to a central repository for storage and analysis.

In developing such a method and system for reporting failures in a program module, there is a need for a method and system for reporting failures that fits well within a corporate environment. A corporation often limits, or even forbids, its users from using the Internet. Thus, there is a need for a method and system for reporting failures that does not require Internet access and may be used on a corporate Intranet.

Corporations often have security or privacy issues that also need to be handled. For example, a corporation may not want its users sending documents to a third party software vendor for analysis of a failure. Thus, there is a need for a method and system for reporting failures that addresses the security and privacy issues of a corporation.

SUMMARY OF THE INVENTION

The present invention satisfies the above described needs by providing a method and system for reporting failures in a corporate environment.

In one aspect, the invention comprises a computer-implemented implemented method and system for reporting failures in an application program module to a corporate file server. The failure may be a crash or a set-up failure. Once detected, the program failures are categorized, i.e. bucketed, and reported directly to a local file server operated by a corporation. The corporate file server may be used to store the failures encountered by users in a corporate environment until these failures are reported to a server operated by the manufacturer of the program module (a destination server). Once the failures are reported to the destination server, developers or programmers may examine the data and determine what is causing the failures in the program module.

In one aspect, a failure reporting executable on the user's computer provides communications between the failed application program module and the local file server. An administrative reporting executable (typically operated at the corporate file server), provides communications between the failure reporting executable and the corporate file server and between the corporate file server and the destination server.

In one aspect, the present invention uses a cab tree, a counts tree and a status tree to store bucket information for a failure. The bucket information for a crash may comprise an AppName, an AppVer, a ModuleName, a ModuleVer, and an offset into that module. The bucket information in the corporate file server may be uploaded to a destination server by a corporate system administrator thus preventing sensitive information from being disclosed by the corporation's users, and allowing the eventual reporting of failures experienced by users that do not have direct access to the Internet.

These and other features, advantages, and aspects of the present invention may be more clearly understood and appreciated from a review of the following detailed description of the disclosed embodiments and by reference to the appended drawings and claims.

DETAILED DESCRIPTION

The present invention is directed to a method and system for reporting failures of a program module in a corporate environment. A failure may be a crash of the program module or a set-up failure during installation of the program module. Once detected, the program failures are categorized and reported directly to a local file server operated by a corporation. The corporate file server may be used to store the failures encountered by users in a corporate environment until these failures are reported to a server operated by the manufacturer of the program module. The server operated by the manufacturer of the program module will be referred to herein as the destination server. Once the failures are reported to the destination server, developers or programmers may examine the data and determine what is causing the failures in the program module. In other embodiments, the invention may be used to store information regarding failures experienced while a user is offline, such as when the user is using a laptop computer and is not connected to the Internet. After the user's computer is online and connected to the Internet, the information regarding the failure may be reported.

Typically, a failure reporting executable on the user's computer provides communications between the failed application program module and the local file server. An administrative reporting executable (typically operated at the corporate file server) provides communications between the failure reporting executable and the corporate file server and between the corporate file server and the destination server.

When there is a failure in a program module and data regarding the failure needs to be uploaded for storage and analysis, a fundamental question needs to be answered: what data is needed to effectively distinguish one failure from another and to provide enough information so that the failure may be fixed by developers? Enough data must be gathered at the program module to uniquely identify a failure, but it is impossible to send all of the information about the failure to the destination server. Additionally, it is impossible for the failure reporting executable to repeatedly query the corporate file server regarding the data to gather due to the expense in time and bandwidth. Thus, the failure reporting executable must be intelligent enough to know what information to gather for different failures. In addition to gathering the correct failure data, it is important to categorize the failure data so that similar failures are grouped together to identify failures that multiple users are experiencing.

The categorization employed by the present invention (referred to as buckets herein) allows the failure reporting executable to pass up a minimal amount of information to the corporate file server. The minimal amount of information passed saves computing time and also allows an easy examination of the failure data. If it is decided that more information is needed to better understand the failure, then more data is retrieved from the application program module and uploaded to the corporate file server as a cab file. The categorization also allows sorting at the destination server and aids the developers of the program module in understanding the frequency at which different failures are occurring.

In one embodiment, the invention is incorporated into the "OFFICE" program module, marketed by Microsoft Corporation of Redmond, Wash. Briefly described, the "OFFICE" program module is a suite of word processing, spreadsheet, presentation, database, and time management application programs along with program modules that integrate and enhance these application programs. While the invention will be described in the general context of the "OFFICE" program module running in conjunction with a personal computer, those skilled in the art will recognize that the invention also may be implemented in combination with other program modules.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

Figure 1:
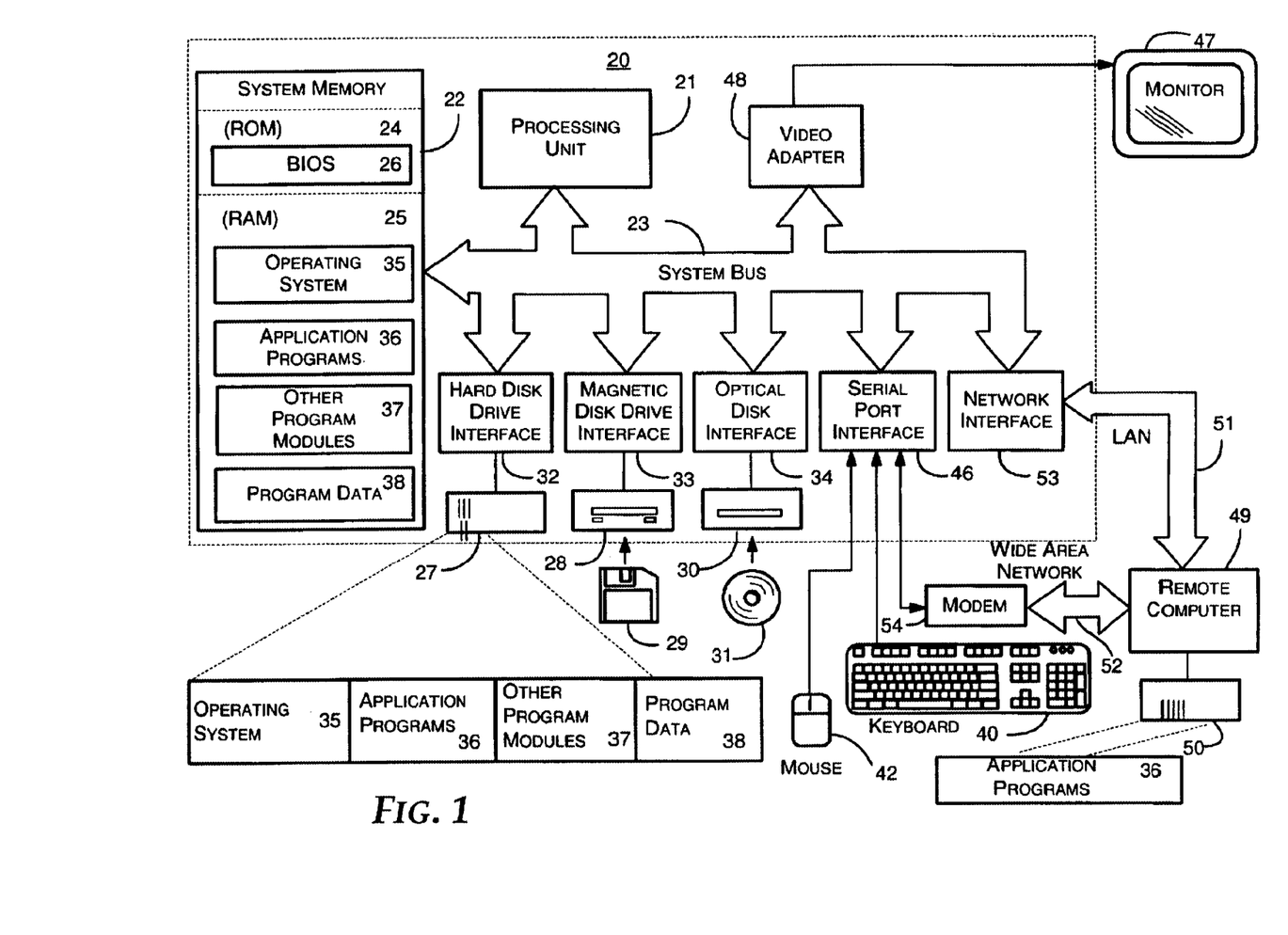
FIG. 1 is a block diagram of a computer that provides the exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an "OFFICE" program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary System for Reporting Failures in a Corporate Environment

In one embodiment, the present invention is a system for reporting to a software manufacturer categorized failure data of one of its program modules in a corporate environment. The categorized failure data is transmitted to a local corporate file server. The categorized failure data is then transmitted to a destination server operated by the software manufacturer. At the destination server, the categorized failure data may then be analyzed by the software manufacturer's developers so that solutions and fixes to the failures may be developed.

Figure 2:
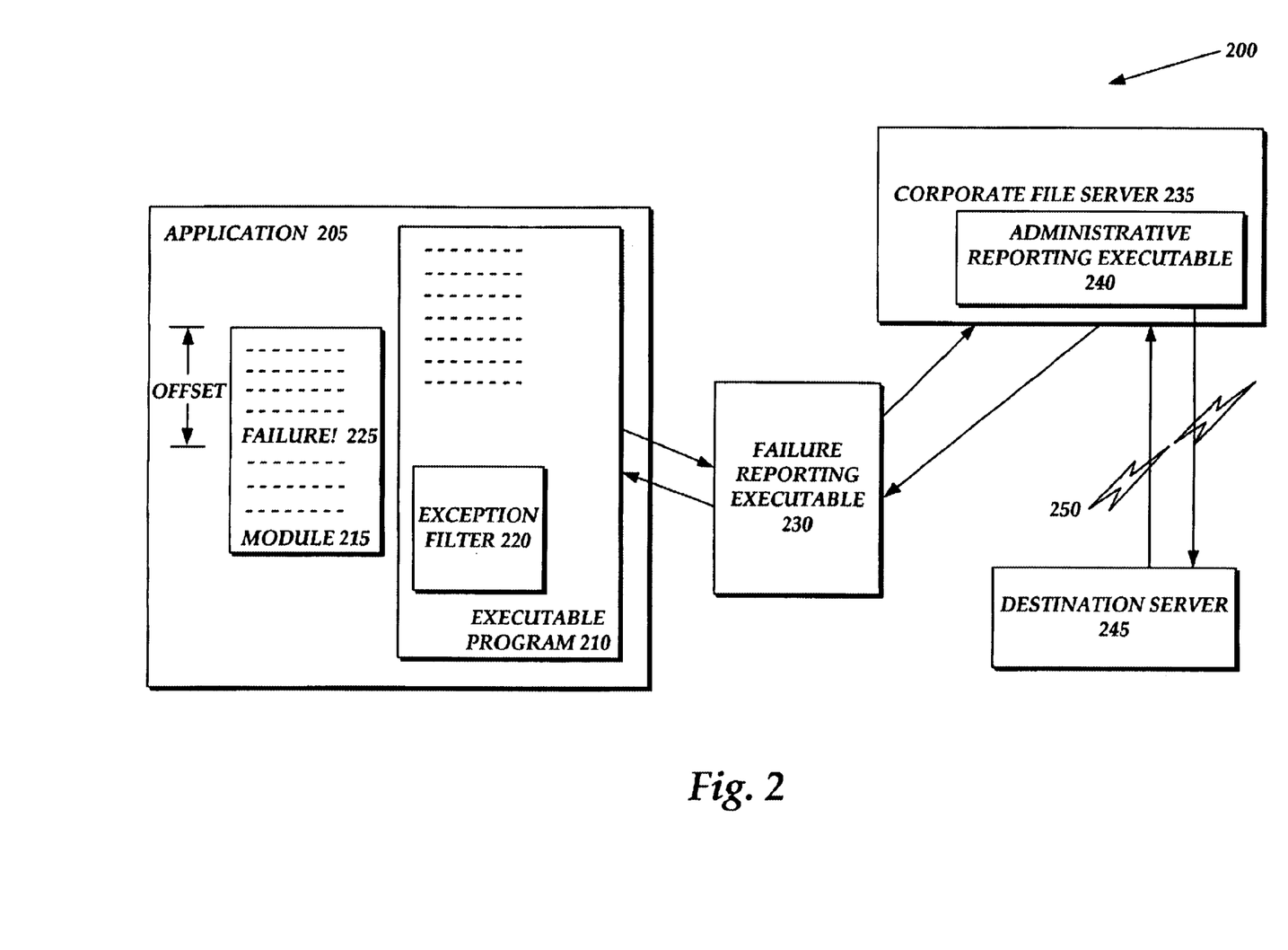
FIG. 2 is a component block diagram of an exemplary system for reporting a program failure in a corporate environment.

Referring now to FIG. 2, a component block diagram of an exemplary system 200 for reporting a program failure in a corporate environment will be described. The system 200 comprises an application program module 205. For example, application program module 205 may be the "WORD" word processor program module, marketed by Microsoft Corporation of Redmond, Wash. and included in the "OFFICE" 37 (FIG. 1) suite of program modules.

The system 200 further comprises an executable program 210 running inside of application program module 205. For example, in the "WORD" word processor program module, the executable program may be "WinWord.exe". An executable program is a program that can be run and typically means a compiled program translated into machine code in a format that can be loaded into memory and run by a computer's processor. The lines of code in executable program 210 are illustrated as dashed lines in FIG. 2.

The system 200 further comprises a module 215 being executed by the executable program 210 inside the application program module 205 at the time of the failure. For example, the module 215 may be a dynamic-link library such as "mso.dll". The lines of code in module 215 are illustrated as dashed lines in FIG. 2.

The system 200 also comprises an exception filter 220. Exception filters are well-known in the art and may be registered by program modules when the operating system 35 is started. When a failure (an exception) occurs, the exception filter 220 code is executed. For example, suppose a failure occurs while executable program 210 is executing instructions running module 215 at location 225. If executable program 210 has registered exception filter 220 with the operating system, then the exception filter 220 is executed when executable program 210 encounters an exception.

In the system 200, exception filter 220 executes a failure reporting executable 230. The failure reporting executable 230 is an executable program comprising all of the instructions needed to communicate between the application program module 205 and a corporate file server 235. The communications between the failure reporting executable 230, the application program module 205 and the corporate file server 235 are illustrated as arrows in FIG. 2. The failure reporting executable 230 is preferably separate from the application program module 205 because of the possible instability of the application program module (having experienced a failure).

The corporate file server 235 is typically a local server that a user may access over a corporate Intranet. For example, a corporation may not allow their employees to have Internet access or a corporation may not want their employees reporting failures directly to an outside software manufacturer (potentially divulging sensitive corporate information). In those instances, the corporate file server 235 provides a convenient place to communicate the failure data.

Running on the file server is an administrative reporting executable 240. The administrative reporting executable 240 provides communications between the failure reporting executable 230 and the corporate file server 235 and between the corporate file server 235 and a destination server 245.

A system administrator at the corporation will typically be tasked with periodically uploading from the corporate file server 235 to the software manufacturer relevant data regarding failures experienced by the corporation's users. The destination server 245 is typically the location where the failure data is uploaded. After analyzing the data at the destination server 245, the software manufacturer may correct the failures being experienced by the corporation. For example, if the application program module is the "WORD" word processor program module, then the destination server 245 may be operated by Microsoft Corporation of Redmond, Wash.

As illustrated by the lightning bolts in FIG. 2, the communications between the corporate file server 240 and the destination server 245 typically take place through one or more firewalls 250.

When a failure in the application program module 205 occurs at location 225, the operating system 35 (FIG. 1) throws the application program module 205 out of memory and the exception filter 220 executes the failure reporting executable 230. The failure reporting executable 230 then must determine the type of failure that has occurred and determine how to categorize the failure for transmission to the repository 235. Typically, the type of failure is either a crash or a set-up failure.

Based upon the type of failure, the failure reporting executable 230 then determines what relevant information to retrieve from the application program module to uniquely identify, i.e. categorize, the failure. In many cases, uniquely identifying the failure means determining the location of the failure. Typically, the categorization, or location information, of the failure is sent to the corporate file server 235 as a bucket. A bucket is a set of information uniquely defining the location of the failure. If a bucket from one failure matches a bucket from another failure, then it is assumed that both failures are caused by the same bug. Although not always accurate (because more than one bug may be at the same location), this assumption that failures with the same bucket information are caused by the same bug allows for effective organization in the corporate file server 235 and the destination server 245, as will be further described below.

The information in a bucket may be different depending on the type of failure (crash or set-up failure). Typically, for a crash, the following five properties are sent to the corporate file server in a bucket:

a name of the executable module where the crash occurred;

a executable module's version number;

a name of the module containing the crashing instruction;

a module's version number; and an actual offset into the crashing module of the crashing instruction (or the address of the crashing instruction itself if the module is not known).

Bucketing

As described above, in one embodiment, the information in a bucket for a crash comprises an AppName, an AppVer, a ModuleName, a ModuleVer, and an offset into that module. The AppName is the name of the executable program 210 that was executing at the time of the failure, such as "WinWord". The AppVer is the version number of the executable program 210 that was executing at the time of the failure, such as "10.1204.1.0". The ModuleName is the name of the module 215 that was executing at the time of the failure, such as "mso.dll". The ModuleVer is the version number of the module 215 that was executing at the time of the failure, such as "10.124.1". The offset is the line number, or vertical offset, into the module where the failure occurred, such as "1234". The offset is illustrated in FIG. 2.

It should be understood that the location of the failure is simply identifying information about the failure so that one failure may be distinguished from another failure. In alternative embodiments of the present invention, the location, i.e., identifying information, of the failure may comprise only a single piece of information rather than AppName, an AppVer, a ModuleName, a ModuleVer, and an offset. Conversely, in alternative embodiments, the location of the failure may comprise a plurality of data.

For more description of bucketing, see "Method and System for Categorizing Failures of a Program Module", U.S. pat. appl. Ser. No. 09/570,664, filed May 15, 2000, commonly assigned and incorporated by reference herein.

The File Tree for Storing Bucketing Information at the Corporate File Server

In one embodiment, the present invention allows a corporation to maintain a corporate file server and set a policy registry key so that the user's failure reporting executable interacts with the corporate file server rather than communicating directly with a destination server. The file tree of the corporate file server is laid out such that the path to a particular leaf directory represents the bucketing information for the failure so that each bucket gets its own set of directories which will serve as the local cache for all of the failure information. The administrative reporting executable is capable of going to each of these directories, determining the bucket information from the name of the directory, synching the data from these directories with the bucket entries at the destination server and uploading any information requested by the destination server.

The administrative reporting executable will also use these directories to record what information the destination server requests regarding a bucket and what information (such as fixes) that the destination server is currently providing for this bucket.

Figure 3:
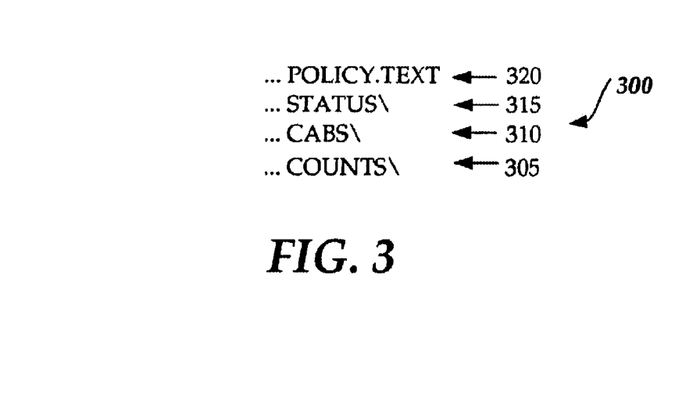
FIG. 3 is an illustration of an exemplary file tree root of a corporate file server in accordance with an embodiment of the present invention.

As described above, the file tree of the corporate file server is organized such that the path to a particular leaf directory represents the bucket information for the failure. Each bucket gets its own set of directories which will serve as the local cache for all of the failure information. Referring now to FIG. 3, an illustration of an exemplary file tree root 300 of a corporate file server in accordance with an embodiment of the present invention will be described.

The file tree root 300 comprises a counts tree 305, a cabs tree 310, a status tree 315 and a policy.txt file 320.

Counts Tree

Figure 4:
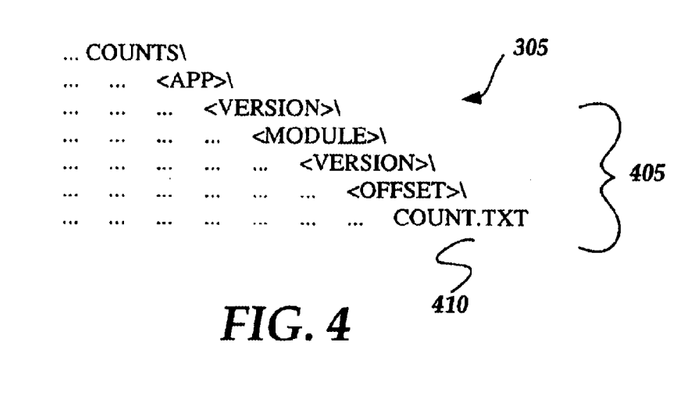
FIG. 4 is an illustration of an exemplary counts tree in accordance with an embodiment of the present invention.
Figure 5:
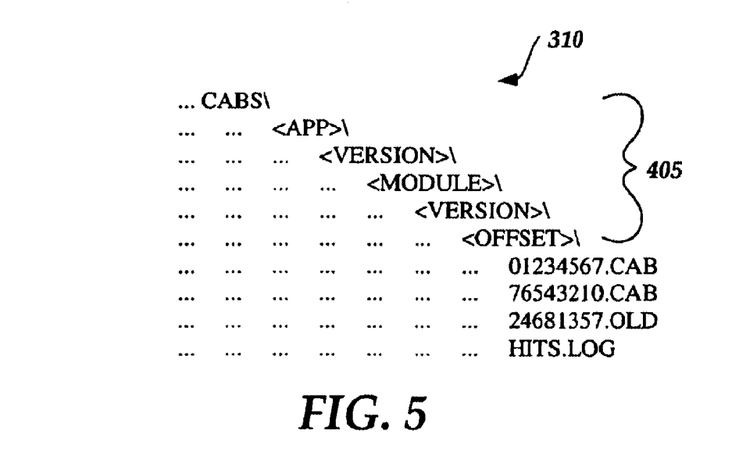
FIG. 5 is an illustration of an exemplary cab tree in accordance with an embodiment of the present invention.
Figure 6:
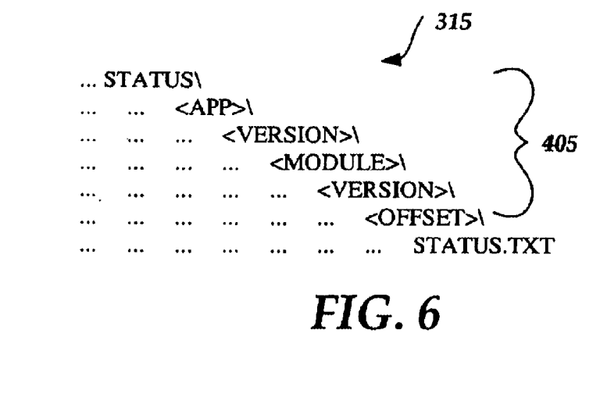
FIG. 6 is an illustration of an exemplary status tree in accordance with an embodiment of the present invention.

Referring now to FIG. 4, an illustration of an exemplary counts tree 305 will be described. As illustrated in FIGS. 4–6, the bucket information 405 forms the branches beneath the file tree root. The bucket information 405 comprises the AppName, the AppVer, the ModuleName, the ModuleVer, and an offset into that module.

The counts tree 305 comprises a count.txt file 410. The count.txt file 410 includes the number of .cab files collected for the failure defined by the bucket information 405 and the number of total hits for the failure (the number of times the failure has been encountered by users). The hits allows one to determine which failures are being experienced the most by users and concentrate on fixing the bug or bugs that are causing those failures.

Using the total number of .cab files collected and the total number of cabs to collect (noted in the status.txt file or a default value if absent), it can be determined whether another .cab file for the failure needs to be collected as will be described below.

The count.txt file is typically read/write for the failure reporting executable.

Cab Tree

Referring now to FIG. 5, an illustration of an exemplary cab tree 310 in accordance with an embodiment of the present invention will be described. The cab tree 310 comprises cab files collected from user's computers. Cab files that need to be uploaded to the destination server 245 have a .cab extension on them. Cab files that do not need to be uploaded, such as those already uploaded, are re-named with the .old extension. Each cab file comprises a unique eight digit number as its name.

The cab tree 310 further comprises a hits.log file comprising the user name, machine name and name of cab for each failure. The administrator of the corporate file server 235 may use a policy setting to turn on and turn off tracking. If tracking is turned off, then there is no hits.log file stored in the cab tree. However if tracking is turned on, then the hits.log file is written to for every failure regardless of whether a cab file was sent to the corporate file server. Using the hits.log file, the administrator can track back to which specific users are experiencing which specific failures.

The failure reporting executable has write only access to the cabs tree because in the cab files may contain potentially sensitive or private information.

Status Tree

Referring now to FIG. 6, an illustration of an exemplary status tree 315 in accordance with an embodiment of the present invention will be described. The status tree 315 comprises a status.txt file. The status.txt file comprises all the information that would normally be obtained from the destination server 245 if the user was not in the corporate environment and could directly connect to the destination server, such as the information that needs to be collected in a cab file and/or a fix for the failure. For example, the status.txt file may comprise what documents, registry keys, and WQL queries are needed from the user's computer and placed in the cab file, how to respond to the user and the bucket number, just to name a few of the possible contents.

The status.txt file may also comprise local policy for a bucket.

The failure reporting executable has read only access to the status tree. However, it should be understood that all of the trees are read/write access for the administrator of the corporate file server using the administrative reporting executable.

Policy.txt

The policy.txt file 320 may comprise the policy set by the system administrator to control behavior on user's computers. The policy settings can exist either locally in status.txt or in policy.txt. There is a hierarchy for the policy settings. At the lowest end is the user's local registry on the user's computer; next is the policy.txt file which overrides any settings in the user's local registry; at the top of the hierarchy is the status.txt file which overrides any of the other policy settings.

Having now described some of the features of the corporate file server 235, reporting a failure to the corporate file server will be described below.

Reporting a Failure to the Corporate File Server

Figure 7:
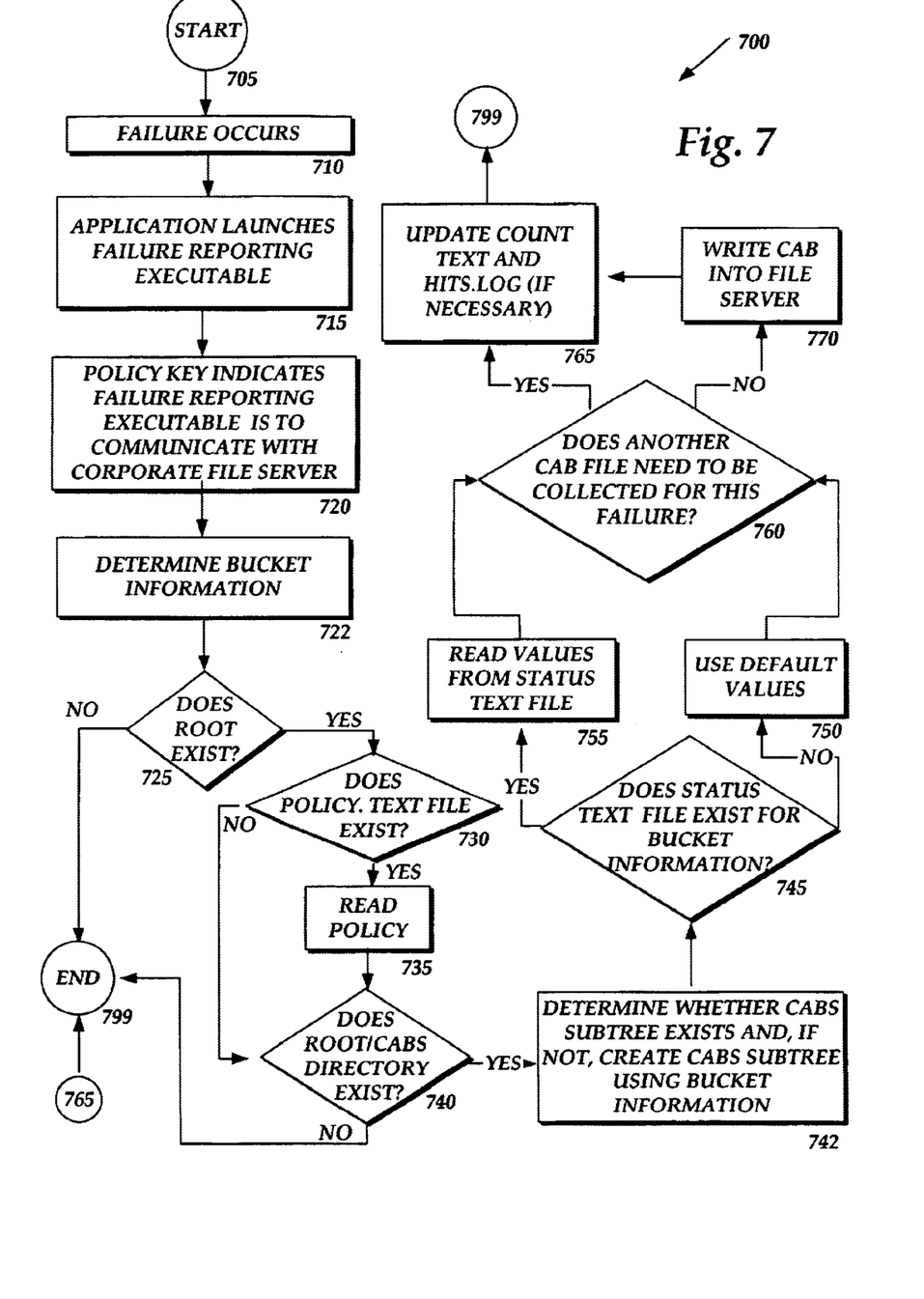
FIG. 7 is a flowchart illustrating a method for reporting a failure in a program module to a corporate file server in accordance with an embodiment of the present invention.

Referring now to FIG. 7, a method 700 for reporting a failure in a program module to a corporate file server in accordance with an embodiment of the present invention will be described.

The method 700 begins at start step 705 and proceeds to step 710 where the application program module 205 fails. The method then proceeds to step 715.

The application program module launches the failure reporting executable 230 at step 715. The method then proceeds to step 720.

At step 720, the failure reporting executable determines that a policy key is set so that the failure reporting executable is to communicate with a corporate file server 235 rather than directly with a destination server 245. The method then proceeds to step 722.

At step 722, the bucket information for the failure is determined by the failure reporting executable. The method then proceeds to decision step 725.

It is determined whether a root 300 exists at the corporate file server at decision step 725. It should be understood that the root is typically the value of the policy key discussed above in reference to step 720. If the root does not exist, then the method ends at step 799. However, if it is determined that the root does exist, then the method proceeds to decision step 730.

At decision step 730, it is determined whether a policy.txt file 320 exists at the root. If so, then the policy set by the administrator is read and overrides any policy settings on the user's computer at step 735. Otherwise, if no policy.txt file exists, then the method proceeds to decision step 740.

At decision step 740, it is determined whether a cabs directory (ROOT/cabs)exists on the corporate file server. If not, then the method ends at step 799. However, if a cabs directory does exist, then the method proceeds to step 742.

At step 742, it is determined whether a cabs subtree already exists for the failure, and, if not, the subtree is created using the bucket information. For example, subtree may be winword.exe\1.2.3.4\mso.dll\2.3.4.5\a12c3d93.

At decision step 745, it is determined whether a status tree exists for the bucket information determined at step 722. If not, then the method proceeds to step 750 and default values are used for the status settings. If the status tree does exist, then the method proceeds to step 755. At step 755, the failure reporting executable reads the status settings from the status.txt file. From step 750 and step 755, the method proceeds to decision step 760.

At decision step 760, it is determined whether any cab files need to be collected for the failure. In certain circumstances, more data may be required by the corporate file server for a particular failure. For example, suppose a particular location 225 is experiencing numerous failures. In order to diagnose and correct the failure, a software developer may determine that it is important to collect certain information. However, because the particular bucket is experiencing numerous failures, it may be inefficient to collect information from every user who experiences the same failure. The corporate file server 235 may be programmed to know what information to collect from users who experience a particular failure and also how many times to collect this information. As part of requesting and receiving the additional data, the failure reporting executable may generate a minidump. The minidump is essentially a collection of relevant information that provides an autopsy of the crashed application program module. In addition to the minidump, the data may comprise registry keys, files, file versions, documents, and WQLs. Essentially, the data may comprise any information needed from the failed application program module 205 to diagnose the failure. In a preferred embodiment, the data is sent to the corporate file server as cab files or in another compressed format. .cab is used as a file extension for cabinet files which are well-known. Cabinet files are multiple files compressed into one and extractable with the extract.exe utility.

Using the total number of .cab files collected and the total number of cabs to collect (noted in the status.txt file or a default value if absent), it can be determined whether another .cab file for the failure needs to be collected at decision step 760.

If, at decision step 760, it is determined that no more cab files need to be collected for the failure, then the method proceeds to step 765.

At step 765, the count.txt file is updated to reflect another hit for the failure and the hits.log is updated if tracking has been turned on by the administrator. The method then ends at step 799.

If, at decision step 760, it is determined that more cab files need to be collected, then the method proceeds to step 770. A cab file is uploaded to the corporate file server and saved with a unique eight digit number as its name. The method then proceeds to step 765 and ends at step 799.

It should be understood that if the cab tree or the counts tree does not exist for a failure, then that tree is created using the bucket information.

Having described reporting a failure to the corporate file server, synching the corporate file server with the destination server will be described below.

Synching the Corporate File Server with the Destination Server

Figure 8:
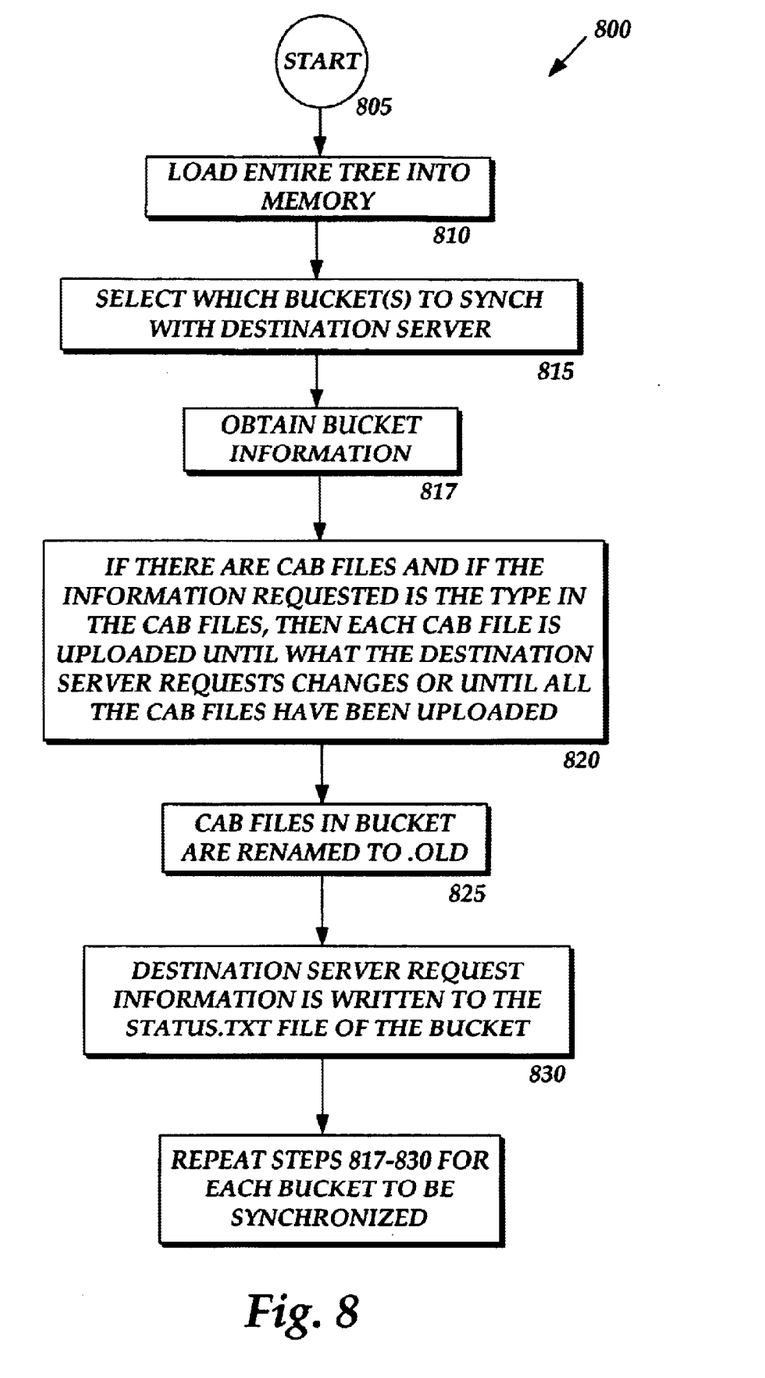
FIG. 8 is a flowchart illustrating a method for synching a corporate file server with a destination server in accordance with an embodiment of the present invention.

Referring now to FIG. 8, a flowchart illustrating a method 800 for synching a corporate file server with a destination server in accordance with an embodiment of the present invention will be described. The method is used when an administrator of the corporate file server wants to upload bucket information to the destination server. The administrator uses the administrative reporting executable to accomplish the uploading.

The method 800 begins at start step 805 and proceeds to step 810 where all the cab trees, counts trees and status trees at the corporate file server are loaded into memory. The method 800 then proceeds to step 815.

At step 815, the administrator selects which failure(s), i.e., which bucket(s), to synchronize with the destination server. The method then proceeds to step 817.

For each bucket to synchronize, the following steps are performed before proceeding to the next bucket: At step 817, the bucket information is obtained from the corporate file server. The method then proceeds to step 820.

At step 820, if there are cab files for the bucket and if the information requested by the destination server is the type in the cab files, then each cab file is uploaded until what the destination server requests changes or until all the cab files have been uploaded. The method then proceeds to step 825. It should be understood that in one embodiment, the status.txt file of the bucket and the status settings of the destination server are compared to determine whether the information requested by the destination server is the type in the cab files.

At step 825, any cab files in the bucket are renamed to old files so that the cab files will not be uploaded again. The method then proceeds to step 830.

At step 830, the destination server request information is written to the status.txt file of the bucket to update it with what to collect in the cab files in the future.

Steps 817–830 are repeated for each bucket that is to be synchronized with the destination server.

It should be understood that the failure reporting executable has default settings to use in case the tree has not been entered for that bucket.

It should be understood that in the method 800 cab files are uploaded from the corporate file server to the destination server for each failure until the cab files from the corporate server have all been uploaded or until the destination server does not need any more cab files.

It should be understood that the file tree described above could be used on a user's computer to provide an offline cache for failures. For example, when a user experiences a failure while working offline, the file tree for the failure may be stored and reported to either the corporate file server or directly to the destination server when the user's computer is connected to a network.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for reporting a failure in an application program module to a file system in a corporate environment, the method comprising the steps of:
   determining a location of the failure in the application program module within the corporate environment;
   using the location to generate a file tree to associate with the failure;
   examining the file system to determine whether the file tree already exists; and
   if not, then adding the file tree to the file system;
   wherein the file system further comprises a destination server operated by a manufacturer of the program module, and the method further comprises receiving requests from the destination server for specific failure information.

2. The method of claim 1 further comprising the steps of:
   if the file tree already exists, then adding an indication to the file tree that the failure has been encountered again.

3. The method of claim 2, further comprising the steps of:
   determining whether the file system requests additional information to be uploaded regarding the failure; and
   if so, then transmitting the additional information to the file system.

4. The method of claim 3 wherein the additional information is transmitted as a cab file.

5. The method of claim 4 wherein the location of the failure is bucket information comprising an application name, an application version, a module name, a module version number, and an offset into the module.

6. The method of claim 5 wherein the application name, the application version, the module name, the module version number, and the offset into the module comprise a plurality of folders of the file tree.

7. The method of claim 6 wherein beneath the application name folder, the application version folder, the module name folder, the module version number folder, and the offset folder are a plurality of subfolders comprises a cabs subfolder, wherein the cabs subfolder comprises the cab file.

8. The method of claim 7 wherein the plurality of subfolders further comprises a status subfolder, wherein the status subfolder comprises data about what to collect in the cab file from the application program module.

9. The method of claim 8 wherein the plurality of subfolders further comprises a counts subfolder, wherein the counts subfolder comprises the number of cab files collected for the failure.

10. A computer-readable medium comprising computer-executable instructions for performing the steps of claim 9.

11. The method of claim 1 wherein the file system comprises a corporate file server.

12. The method of claim 11 further comprising storing failure data on the corporate file server until a decision is made to report the failure data to the destination server.

13. The method of claim 1 further comprising uploading failure data to the destination server from the file system, wherein the file system comprises a corporate file server.

14. The method of claim 13 wherein the step of uploading the failure data to the destination server is performed by a corporate system administrator.

15. The method of claim 13 further comprising the step of preventing users, other than a corporate system administrator, form uploading the failure data to the destination server.

16. The method of claim 13 further comprising the step of analyzing the failure data received by the destination server.

17. A method for reporting a failure in an application program module to a file system in a corporate environment, the method comprising the steps of:
   determining a location of the failure in the application program module within the corporate environment;
   using the location to generate a file tree to associate with the failure;
   examining the file system to determine whether the file tree already exists; and
   if not, then adding the file tree to the file system;
   wherein the corporate environment further comprises a policy registry key for reporting failures to a corporate file server instead of reporting directly to a destination server operated by a manufacturer of the program module.

18. The method of claim 17 wherein the method further comprises the steps of:
   storing the file tree on the corporate file server until a decision is made to report the failure data to the destination server; and
   uploading failure data from the corporate file server to a destination server via a corporate system administrator.

19. A method for reporting a failure in an application program module to a file system in a corporate environment, the method comprising the steps of:
   determining a location of the failure in the application program module within the corporate environment, wherein the location of the failure is bucket information comprising an application name, an application version, a module name, a module version number, and an offset into the module;
   using the location to generate a file tree to associate with the failure, wherein the file tree comprises a plurality of folders containing the bucket information;
   examining the file system to determine whether the file tree already exists; and
   if not, then adding the file tree to the file system.

20. The method of claim 19 further comprising the steps of:
   determining whether the file system requests additional information to be uploaded regarding the failure; and
   if so, then transmitting the additional information to the file system.

21. The method of claim 19 further comprising uploading failure data from the file system to a destination server operated by a manufacturer of the program module, wherein the file system comprises a corporate file server.

22. The method of claim 19 wherein the corporate environment further comprises a policy registry key for reporting failures to a corporate file server instead of reporting directly to a destination server operated by a manufacturer of the program module.

23. A method for reporting a failure in an application program module to a file system, the method comprising the steps of:
   determining a location of the failure in the application program module within the corporate environment;
   using the location to generate a file tree to associate with the failure;
   examining the file system to determine whether the file tree already exists; and
   if not, then adding the file tree to the file system;
   wherein the file system comprises (i) a corporate file server and (ii) a destination server operated by a manufacturer of the program module, and the method further comprises the steps of:
      storing the file tree on the corporate file server until a decision is made to report the failure data to the destination server; and
      uploading failure data from the corporate file server to a destination server via a corporate system administrator.

24. The method of claim 23 wherein the corporate environment further comprises a policy registry key which prohibits reporting of failures directly to the destination server without passing through the corporate file server.

* * * * *

UNITED STATES PATENT AND TRADEMARK OFFICE
CERTIFICATE OF CORRECTION

PATENT NO. : 6,708,333 B1
DATED : March 16, 2004
INVENTOR(S) : Glerum et al.

It is certified that error appears in the above-identified patent and that said Letters Patent is hereby corrected as shown below:

Column 12,
Line 24, "comprises a" should read -- comprising a --

Signed and Sealed this

Tenth Day of August, 2004

JON W. DUDAS
*Acting Director of the United States Patent and Trademark Office*